Figure 1:
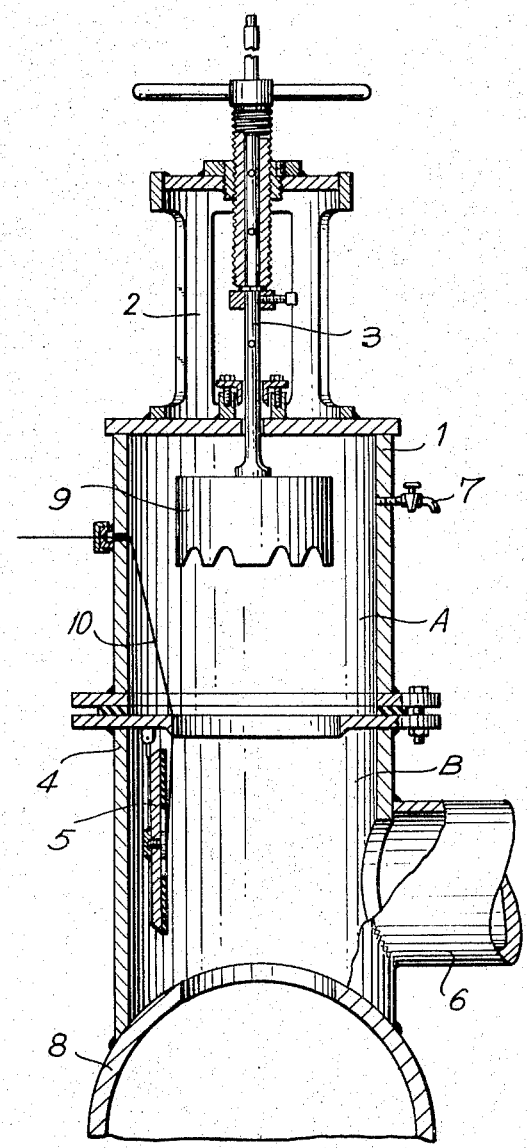

United States Patent Office 3,335,742
Patented Aug. 15, 1967

3,335,742
DEVICE FOR JOINING BRANCHES TO OPERATING GAS OR HYDRAULIC PIPELINES
Samuil Jakovlevich Novak, Moscow, U.S.S.R., assignor to Trest Mosgazsetjstroi, Moscow, U.S.S.R.
Filed Oct. 24, 1963, Ser. No. 318,579
10 Claims. (Cl. 137—318)

The present invention relates to devices for joining branches to operating gas or hydraulic pipelines and, more particularly, to operating gas mains maintained under any service pressure without shutting off previously connected pipelines.

Hitherto whenever a branch was to be connected to a gas or hydraulic main the usual practice was to shut off pipelines previously connected to that main.

Devices are known, however, for joining branches to gas mains without shutting off the pipelines which feed consumers. Such devices comprise a flanged connection with a threaded hole, welded onto the main, and a special slide and a chamber with a shaft carrying a cutter, attached to the connection.

The joining of a branch involves the following successive operations: welding on the connection; mounting the slide and the chamber with the cutter; cutting a hole in the main pipe; closing the slide and removing the chamber and the cutter; replacing the cutter with a plug and again mounting the chamber; screwing the plug into the threaded hole; removing the slide and the chamber; calking and welding on the plug.

Said devices have certain disadvantages: they are cumbersome; their use involves much labor; the pressure-tight sealing of the connection is never absolutely reliable; the final operations of calking and welding the plug involve much risk and, therefore, the application of said devices is confined to a rather limited range of service pressures in the mains.

A device according to the invention eliminates special slides and connections closed with threaded plugs, and comprises a suspension valve which is made pressure-tight by a force developed by service pressure maintained in the pipeline.

It has been established that the use of devices made in accordance with the present invention ensures work safety in joining branches to pipelines operating practically under any service pressure (from 0.02 kg./cm.$^2$ and up to a maximum which depends on the mechanical strength of the pipes and component devices).

It is an object of the present invention to ensure work safety in joining branches to operating pipelines.

Another object of this invention is to provide for the application of branches on high-pressure pipelines.

Still another object of the invention is to provide a device for joining branches to operating gas or hydraulic pipelines, which is characterized by its small size, low weight, and simple construction.

A further object of the present invention is to reduce the amount of labor necessary for joining branches to operating gas or hydraulic pipelines.

Figure 2:
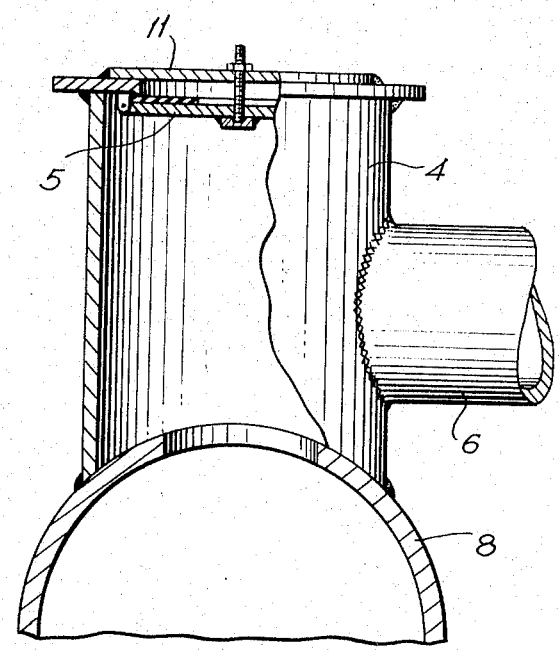

Other objects and advantages of the invention will become apparent from the following description and the accompanying drawings of an embodiment thereof in which:

FIG. 1 is an elevation view in section of an embodiment according to the invention mounted on a connection which is welded to an operating pipeline; and FIG. 2 shows in section a completed branch-pipeline connection assembly.

The said device according to the invention comprises a chamber 1 and a cylinder 2 carrying a shaft 3 with a cutter supported therefrom. Chamber 1 is bolted to a fitting 4 which is furnished with a suspension valve 5 having a gasket which may, for example, be made of rubber. Welded to fitting 4 is branch 6. Chamber 1 is provided with a cock 7.

The joining of a branch to an operating pipeline is accomplished in the following manner.

A fitting 4 with a pipe 6 is welded to the operating pipeline 8. Then chamber 1 with cylinder 2 is mounted on fitting 4 and a hole is cut in the pipeline 8 by means of cutter 9. Valve 5 is then closed by means of a wire rope 10 and, as soon as the working medium is discharged from cavity A through cock 7, the valve is tightly pressed against its seat due to a pressure differential in cavities A and B which are respectively at atmospheric pressure and at service pressure.

The device is removed from fitting 4 and the flange of the fitting 4 is closed by cover 11 (see FIG. 2), said cover being held in position by means of a nut and a stud, the latter being screwed into the seat of valve 5. The cover 11 is then welded around its periphery to fitting 4.

The device according to the present invention makes the connecting pipe absolutely pressure-tight and, consequently, provides for safe working conditions.

The invention also makes it possible to reduce the overall size and weight of the device by simplifying its design thus creating conditions for carrying out necessary operations without special facilities and with a minimum of labor for joining branch pipes to operating pipelines.

Although a preferred embodiment of the present invention has been described in the specification, various modifications may be made without departing from the spirit and scope of the invention as those skilled in the art will easily understand. Such modifications are regarded as falling within the spirit and scope as defined by the appended claims.

What I claim is:

1. A device for connecting a branch pipe to a main pipe which is adapted for carrying pressure fluid, said device comprising a fitting secured to said main pipe and including a branch pipe, said fitting having an opening which provides access to the main pipe, a valve hingeably supported on the fitting for closing the opening in the fitting, said valve normally resting by the action of gravity in a position in which the opening in the fitting is open, means defining a closed chamber detachably secured to the fitting, cutting means supported within the chamber for extending through the opening in the fitting for cutting an opening in the main pipe to allow pressure fluid to escape therefrom into the fitting and into the chamber, means connected to the valve and extending through said opening in the fitting into the chamber and controlled externally thereof for closing the valve to close the opening in the fitting, said valve being hingeably supported from the fitting and being acted upon by the pressure of fluid in the fitting when the valve is in closed position and means for reducing the pressure in the chamber after the valve has been moved to closed position such that the valve will be maintained in closed position by the pressure of the fluid in the fitting.

2. A device as claimed in claim 1 wherein said means for closing the valve is a flexible tension member.

3. A device as claimed in claim 2 wherein said flexible tension member is a wire rope, the valve being eccentrically hinged to the fitting.

4. A device as claimed in claim 3 wherein said wire rope extends from the valve through the opening in the fitting, into the chamber, and externally of the chamber.

5. A device as claimed in claim 1 wherein said fitting and chamber are axially aligned and extend radially from the main pipe.

6. A device as claimed in claim 5 wherein the cutting means is a cutter supported for axial displacement through the chamber and fitting.

7. A device as claimed in claim 6 wherein the opening in the fitting lies in a transverse plane and the valve is a flat member which is eccentrically hinged to the fitting and covers the opening in the fitting from within the fitting such that pressure fluid in the fitting forces the valve against the fitting thereby tending to hold the valve in the closed position thereof.

8. A device as claimed in claim 1 comprising a cover permanently secured to the fitting, with the means defining the chamber detached from the fitting, and the valve in the closed position thereof.

9. A device as claimed in claim 8 comprising means connecting the cover and the valve to secure the latter in the closed position thereof.

10. Apparatus for connecting a branch pipe to a main pipe which is adapted for conveying pressure fluid while the latter is conveying pressure fluid, said apparatus comprising a fitting secured to the main pipe and adapted for conveying pressure fluid to the branch pipe, said fitting having an opening, means defining a closed chamber detachably secured to the fitting and in communication therewith via said opening, cutting means in said chamber for entering the fitting through said opening and forming an opening in the main pipe to release a quantity of pressure fluid from the main pipe to fill the fitting and the chamber, a valve supported from the fitting for closing said opening to thereby close communication between the fitting and the chamber, said valve having an open position under the action of gravity in which said opening in the fitting is open and communication is established between the fitting and the chamber, means connected to the valve to move the same to a closed position in which communication between the fitting and chamber is closed, the latter means comprising a tension member connected to the valve and extending through the opening in the fitting into the chamber and externally thereof, means for releasing pressure fluid from the chamber to establish a pressure differential between the chamber and the fitting when the valve is closed and means supporting the valve from the fitting to cause the valve to be subjected to the force of the pressure fluid in the fitting which in the closed position of the valve tends to keep the valve in the closed position, whereby the means defining the closed chamber may then be removed from the fitting and the latter placed into communication with the branch pipe.

References Cited
UNITED STATES PATENTS

| | | | |
|---|---|---|---|
| 936,618 | 10/1909 | Ford | 77—40 |
| 1,463,093 | 7/1923 | Pearson et al. | 251—294 |
| 2,281,781 | 5/1942 | Merrill et al. | 137—318 |
| 2,790,652 | 4/1957 | Risley et al. | 137—318 X |

WILLIAM F. O'DEA, *Primary Examiner.*

ISADOR WEIL, D. R. MATTHEWS,
*Assistant Examiners.*